June 6, 1961 M. A. STREHLEIN 2,986,791
FASTENER
Filed April 7, 1958
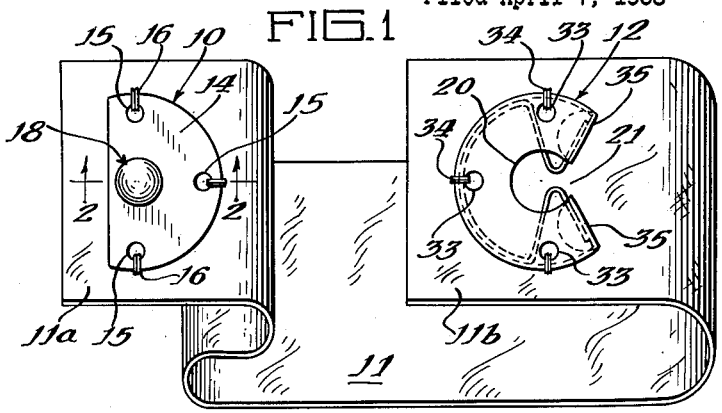
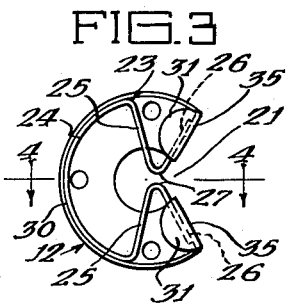
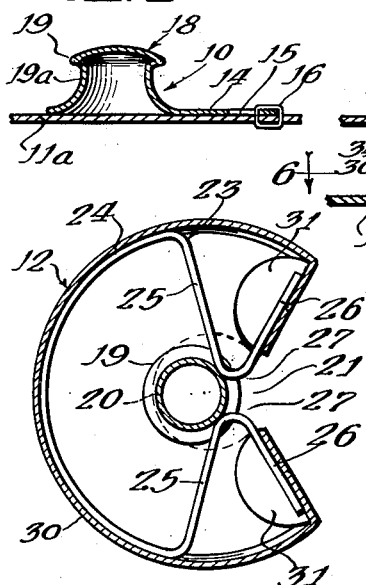
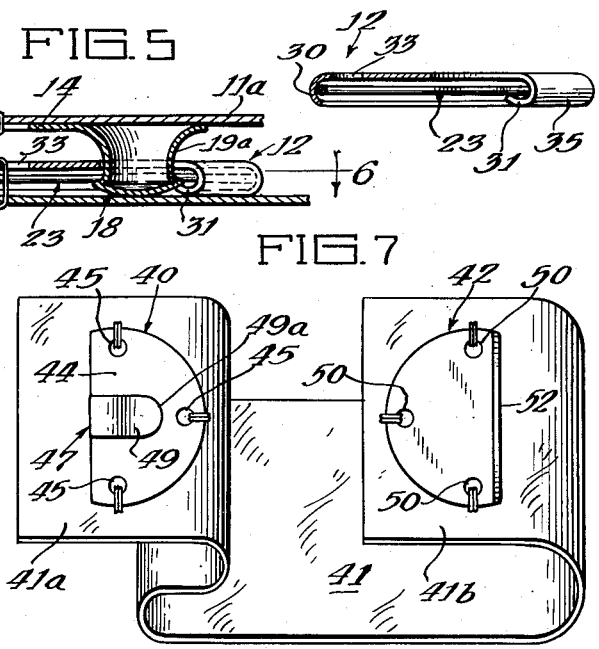
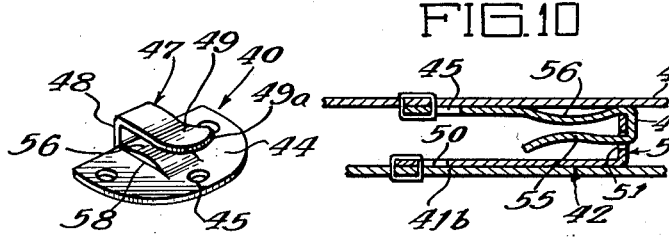
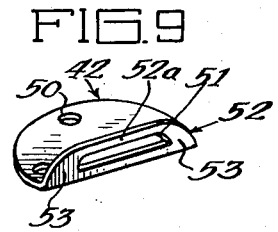
Inventor:
Mary A. Strehlein
By: Schroeder, Hofgren,
Brady & Wegner
Attorneys United States Patent Office 2,986,791
Patented June 6, 1961

2,986,791
FASTENER
Mary A. Strehlein, 7464 N. Greenwood, Chicago, Ill.
Filed Apr. 7, 1958, Ser. No. 726,813
2 Claims. (Cl. 24—222)

This invention relates to fasteners more particularly, though not exclusively, for garments to detachably secure together two portions thereof.

It is a general object of the invention to provide new and improved fasteners of the type described.

Another object is to provide a new and improved fastener of the type described which is simple and economical to manufacture, which is of durable construction, which may be easily manipulated to fastened and unfastened condition, which is not liable to accidental disengagement, and which is not likely to damage sheer or fragile materials with which it may be used.

A more specifiic object is to provide a new and improved fastener of the type described which may be manipulated to fastened and unfastened condition simply by a single straightline lateral motion of two fastener parts relative to each other in parallel planes parallel to the planes of overlapped portions of a garment to which the fastener is attachable.

A further object is to provide a new and improved fastener of the type described which may be made of sheet metal and which includes guide portions to facilitate manipulation of the fastener to fastened condition.

Another object is to provide a new and improved fastener of the type described including a stud-equipped member detachably engageable with a spring-latch-equipped member having guide portions thereon for directing the stud to latched position.

Other objects, features and advantages of the present invention will be apparent from the following description taken in conjunction with the accompanying drawings, in which:

FIG. 1 is a perspective view of a band, representative of a portion of clothing or the like, the ends of which are to be releasably secured together, showing these ends as equipped with cooperating parts of a fastener embodying the principles of the present invention, the parts of the fastener being shown in disengaged condition;

FIG. 2 is an enlarged sectional view of one of the fastener parts, taken at about the line 2—2 of FIG 1;

FIG 3 is a bottom plan view of the other fastener part shown in FIG 1;

FIG. 4 is a sectional view of said other fastener part, taken at about the line 4—4 of FIG 3;

FIG. 5 is a sectional view through the overlapped ends of the band shown in FIG 1 and the fastener parts in engaged position, the section being taken along a line similar to that at 2—2 in FIG. 1 and at 4—4 in FIG 3;

FIG. 6 is a sectional view taken at about the line 6—6 of FIG. 5;

FIG. 7 is a perspective view of the band similar to that shown in FIG. 1, illustrating the cooperating parts of another fastener in disengaged condition;

FIG. 8 is a perspective view of one of the fastener parts shown in FIG. 7;

FIG. 9 is a perspective view of the other fastener part shown in FIG. 7; and

FIG. 10 is a sectional view similar to FIG. 5 showing the parts of the fastener of FIGS. 7, 8 and 9 in engaged condition.

While this invention is susceptible of embodiments in many different forms, there is shown in the drawing and will herein be described in detail specific embodiments, with the understanding that the present disclosure is to be considered as an exemplification of the principles of the invention and is not intended to limit the invention to the embodiments illustrated. The scope of the invention will be pointed out in the appended claims.

Referring now to the drawings in more detail, a preferred form of fastener illustrated in FIGS. 1 to 6 includes a stud equipped fastener body 10 attached to one end 11a of a band 11 and a latch equipped fastener body 12 attached to end 11b of the band.

The stud equipped fastener body 10 is preferably constructed of sheet metal material and includes a generally flat main body portion 14 of part circular configuration as illustrated and having several openings 15 therethrough adjacent its outer periphery and spaced from each other to permit attachment of the fastener body to a garment or the like as by sewing illustrated at 16. Adjacent the non-arcuate edge of the fastener body, it is formed with or provided with an upstanding stud 18. As illustrated, the stud is formed in the main body portion 14 by a punching or drawing operation, and includes an enlarged head 19 at the free end thereof and a reduced portion 19a inwardly from the head.

The latch equipped fastener body 12 is preferably formed of generally flat sheet metal material having a part circular configuration and provided with a central aperture 20 therethrough including a mouth 21 which opens laterally to one side of the fastener body to permit lateral insertion of the stud 18 into the aperture 20 and removal therefrom. The body 12 is equipped with a spring latch 23 preferably formed of spring wire and including an arcuately shaped midportion 24 positioned adjacent the arcuate edge of the fastener body, inwardly directed intermediate portion 25 which extend toward the mouth 21, outwardly directed end portions 26, and latch portions 27 respectively at the junctures of end portions 26 with intermediate portions 25.

The latch spring 23 is preferably held on the fastener body 12 by retaining portions formed integrally on the body 12. More specifically, the arcuate edge of the fastener body is provided with a downwardly and inwardly turned edge portion 30 and forms an arcuately extending seat for the arcuately shaped midportion 24 of the latch spring. At the non-arcuate entrance edge of the fastener body, it includes tabs 31 which are turned downwardly and inwardly against the under surface of the body to provide recesses which respectively house the ends 26 of the latch spring for reciprocable movement in the direction of their length as occurs on insertion and removal of the stud 18 laterally through the mouth 21.

As in the case of the fastener body 10, the body 12 may also be provided with openings such as those at 33 to facilitate attachment of the fastener body to the band shown or to clothing as by sewing illustrated at 34.

At the non-arcuate entrance edge of the fastener body 12, it includes, at opposite sides of the mouth 21, guide surfaces 35 which are provided by the downwardly turned tabs 31 and extend from the outer edge of the fastener body inwardly toward the mouth 21 in a somewhat radial direction, though not necessarily falling on a true radius. The guide surfaces 35 are inclined relative to the lateral motion of the stud on entering the mouth and function to direct the stud into the mouth 21 and the aperture 20.

In operation, it will be understood that the fastener may be manipulated from the position of FIG. 1 to a fastened condition illustrated in FIGS. 5 and 6 and by inverting the band end 11a and at the same time moving said end to position the stud 18 to the right of the fastener body 12 (FIG. 1) adjacent the entrance portion and mouth 21. Due to the downwardly turned edge portion 30 and the tabs 31 on fastener body 12, the latch portions 27 and the main body portion of fastener body 12 are slightly elevated from the surface of the band end 11b. Thus, when the head 19 of the stud 18 is positioned on the material of the band 11 adjacent the mouth 21, the only motion necessary to latch the fastener parts together is a relative lateral motion between fastener bodies in parallel planes. Such motion will position the reduced portion 19a of the stud 18 at the mouth 21 to engage latch portions 27 and deflect these portions sufficiently to permit passage of the stud into the aperture 20, where it comes to rest with the head of the stud beneath latch portions 27 and beneath the material of the fastener body 12 adjacent the aperture. In this manner, the stud is releasably held from lateral removal by the latch portions 27, and at the same time is held against removal in a direction normal to the planes of the fastener bodies by engagement of the head 19 beneath the latch portions and fastener body. It will be appreciated that frequently fasteners of the type described are positioned in awkward and hard to reach positions where they may not be easily observed during fastening. An important advantage resides in the provision of the inclined guide surfaces 35 which avoid the necessity of precisely locating the stud relative to the aperture on an initial attempt, and serve to direct the stud into the aperture.

FIGS 7 to 10 illustrate a modified form of sheet metal fastener including a hook equipped fastener body 40 attached to end 41a of a band 41 and an eyelet equipped fastener body 42 attached to end 41b of the band. The hook equipped fastener body 40 preferably comprises a flat sheet metal main portion 44 of part circular configuration and provided with spaced apertures as at 45 to permit attachment of the body to clothing or the like. At the non-arcuate edge, the fastener body includes a tongue 47 bent first upwardly as at 48 and then over the main portion 44 as at 49 to form an integral hooklike part of flat sheet metal material.

The fastener body 42 also is formed of flat sheet metal material of part circular configuration suitably provided with openings as at 50 for attaching the body to the band 41. At the non-arcuate edge of the fastener body 42 it includes an upwardly turned band or flange 52 which is formed with a laterally elongated opening 51 having a mouth or entrance opening away from the body for receiving the free end 49 of the hook 47. The lateral extent of the opening 51 is considerably less than that of the flange 52 so that guide or abutment surfaces 53 are provided at opposite sides of the aperture. As in the case of guide surface 35 in FIGS. 1 to 6, the surfaces 53 are abuttable by the free end 49 of the hook to facilitate proper location of the hook relative to the aperture 51. Proper location of the hook is also facilitated due to the fact that the free end 49 has a substantial width for encountering surfaces 53 and further, is rounded as seen at 49a in FIGS. 7 and 8 to aid in directing the hook into the aperture.

Fastener body 40 is preferably comprised of spring-like metal material, and the hook 47 is formed for cooperation with the fastener body 42 in a manner to releasably retain the two fastener bodies in fastened condition. To this end, the hook is formed with an intermediate portion 55 (FIG. 10) which is rounded toward the main portion 44 of the fastener body 40, and the latter includes an opposed raised portion 56 which, with portion 55, together form a throat of less height than the flange portion 52 above aperture 51 so that the parts 55 and 56 must be sprung apart in order to move the hook to fastened or unfastened condition. The raised portion 56 on fastener body 40 may simply be pressed upwardly in the main portion 44, or the main portion may be slit as seen at 58 in FIG. 8 and the slit portion bent upwardly.

It should be understood that the parts 10, 40 and 42 described above may be provided with rolled edges, if desired, in order to avoid damage to sheer or fragile material. Each of the fastener bodies described above may be economically and expeditiously formed as by stamping from sheet metal material which provides an extremely durable construction of extended operative life. In each embodiment, the fastener is moved to fastened and unfastened condition simply by a single straightline lateral motion of the two fastener bodies relative to each other in parallel planes, and guide means is provided to facilitate manipulation to fastened condition by the sense of feel rather than the necessity for viewing the fastener.

I claim:

1. A sheet metal fastener, comprising: a first generally flat sheet metal fastener body having a stud upstanding thereon with an enlarged head at the free end thereof; a second fastener body of generally flat sheet metal having a front portion and a rear portion and being provided with a central aperture through the second fastener body, the central aperture having a mouth opening forwardly through the front portion of the body of a size to permit rearward insertion of the stud into latched position in the central aperture, the front portion having diverging edge surfaces directed outwardly from opposite sides of the mouth to guide the stud into the mouth toward the central aperture, said rear portion of the second fastener body having a downwardly turned rear edge portion affording a rear spring seat and having a tab at each of said diverging guide surfaces turned downwardly and toward the fastener body to afford a pair of forward spring seats spaced laterally of the front portion of said second fastener body; and an integral elongated latch spring element having an arcuately shaped rear portion, a pair of intermediate portions extending laterally inwardly and forwardly toward each other to cooperatively afford latching portions for the stud, and end portions extending laterally outwardly and forwardly from said intermediate portions, said latch spring element being yieldingly deformed and positioned so that its rear portion is disposed in said rear spring seat, each of its end portions is disposed in one of said forward spring seats, and said latching portions are disposed in said mouth opening whereby said latching portions are yieldingly supported by said end portions of the latch spring element and said pair of forward spring seats to oppose unlatching forces tending to move said stud from latched position in the central aperture outwardly through the mouth of the front portion of the second fastener body.

2. A sheet metal fastener, comprising: a first generally flat sheet metal fastener body having a stud upstanding thereon with an enlarged head at the free end thereof; a second generally flat sheet metal fastener body of part circular plan configuration having a central aperture therethrough including a mouth opening forwardly to the front non-circular side of the body to permit rearward insertion of the stud into latched position in the central aperture and having generally radially directed edge surfaces inclined rearwardly and laterally inwardly toward each other and toward opposite sides of the mouth to guide the stud into the mouth, said second fastener body having a downwardly turned rear edge portion affording a rear spring seat and having tabs at said radially directed guide surfaces turned downwardly and toward the fastener body to afford a pair of forward spring seats spaced laterally of said second fastener body; and an integral elongated latch spring element having an arcuately shaped rear portion, a pair of intermediate portions extending laterally inwardly and forwardly toward each other to cooperatively afford latching portions for the stud, and end portions extending laterally outwardly and forwardly from said intermediate portions, said latch spring element being yieldingly deformed and positioned so that its rear portion is disposed in said rear spring seat, each of its end portions is disposed in one of said forward spring seats, and said latching portions are disposed in said mouth opening whereby said latching portions are yieldingly supported by said end portions of the latch spring element and said pair of forward spring seats to oppose unlatching forces tending to move said stud from latched position out the mouth of the second fastener body.

References Cited in the file of this patent

UNITED STATES PATENTS

| | | |
|---|---|---|
| 1,489,346 | Davis | Apr. 8, 1924 |
| 2,239,004 | Jung | Apr. 22, 1941 |

FOREIGN PATENTS

| | | |
|---|---|---|
| 888,419 | Switzerland | Mar. 1, 1921 |